United States Patent
Shah

(10) Patent No.: US 11,588,829 B2
(45) Date of Patent: Feb. 21, 2023

(54) METHODS AND APPARATUS FOR NETWORK DETECTION OF MALICIOUS DATA STREAMS INSIDE BINARY FILES

(71) Applicant: McAfee, LLC, Santa Clara, CA (US)

(72) Inventor: Chintan Shah, Bangalore (IN)

(73) Assignee: McAfee, LLC, San Jose, CA (US)

(*) Notice: Subject to any disclaimer, the term of this patent is extended or adjusted under 35 U.S.C. 154(b) by 259 days.

(21) Appl. No.: 16/914,246

(22) Filed: Jun. 26, 2020

(65) Prior Publication Data
US 2021/0352089 A1    Nov. 11, 2021

(30) Foreign Application Priority Data

May 7, 2020    (IN) .............................. 202011019433

(51) Int. Cl.
*H04L 9/40*    (2022.01)

(52) U.S. Cl.
CPC ................................ *H04L 63/1416* (2013.01)

(58) Field of Classification Search
CPC .................................................. H04L 63/1416
USPC .......................................................... 726/23
See application file for complete search history.

(56) References Cited

U.S. PATENT DOCUMENTS

| | | | | |
|---|---|---|---|---|
| 7,624,446 B1* | 11/2009 | Wilhelm | ............. | H04L 63/1416 709/224 |
| 7,890,227 B2* | 2/2011 | Sayama | ................ | H02J 9/061 701/1 |
| 8,307,435 B1* | 11/2012 | Mann | .................... | G06F 21/566 717/124 |
| 8,695,096 B1* | 4/2014 | Zhang | .................. | G06F 21/564 707/811 |
| 8,898,648 B2* | 11/2014 | Chung | ................ | G06F 11/3624 717/148 |
| 8,935,779 B2* | 1/2015 | Manni | .................. | G06F 21/566 726/25 |
| 10,284,476 B1* | 5/2019 | Lee | ...................... | H04L 63/1408 |
| 10,320,820 B2* | 6/2019 | Lord | .................... | H04L 63/1416 |
| 10,382,465 B2* | 8/2019 | Gupta | ................. | H04L 63/1433 |

(Continued)

OTHER PUBLICATIONS

Ivan Fratrić, "ROPGuard: Runtime Prevention of Return-Oriented Programming Attacks," University of Zagreb Faculty of Electrical Engineering and Computing, Sep. 24, 2012, (49 pages).

*Primary Examiner* — Badrinarayanan
*Assistant Examiner* — Badri Champakesan
(74) *Attorney, Agent, or Firm* — Hanley, Flight & Zimmerman, LLC

(57) ABSTRACT

Methods, apparatus, systems and articles of manufacture are disclosed to detect an attack in an input file. An example apparatus includes a detection controller to identify a section of a number of bytes of data in a buffer including a first or second byte of data indicative of a value within a preconfigured range, the preconfigured range corresponding to a range of values indicative of memory addresses, update a merged list with a chunk of data that includes the section having the first or second byte of data indicative of the value within the preconfigured range, and a reoccurrence detector to concatenate the chunk of data in the merged list into a string to identify a number of occurrences the string matches remaining data in the buffer, and in response to a detection of the number of occurrences exceeding an occurrence threshold, determine that the data includes a malicious data stream.

21 Claims, 9 Drawing Sheets

(56) References Cited

U.S. PATENT DOCUMENTS

| | | | |
|---|---|---|---|
| 10,419,458 B2 * | 9/2019 | Moscovici | H04W 12/122 |
| 10,893,059 B1 * | 1/2021 | Aziz | G06F 21/53 |
| 10,944,770 B2 * | 3/2021 | Roy | G06N 20/00 |

* cited by examiner

METHODS AND APPARATUS FOR NETWORK DETECTION OF MALICIOUS DATA STREAMS INSIDE BINARY FILES

RELATED APPLICATION

It is noted that this patent claims priority from Indian Provisional Patent Application Serial Number 202011019433, which was filed on May 7, 2020, and is hereby incorporated by reference in its entirety.

FIELD OF THE DISCLOSURE

This disclosure relates generally to binary files, and, more particularly, to methods and apparatus for network detection of malicious data streams inside binary files.

BACKGROUND

Computer exploits are techniques that may be used to compromise the security of a computer system or data. Such exploits may take advantage of a vulnerability of a computer system in order to cause unintended or unanticipated behavior to occur on the computer system. For example, Return Oriented Programming (ROP) exploits may involve identifying a series of snippets of code that are already available in executable memory (e.g., portions of existing library code), and which are followed by a return instruction (e.g., a RET instruction). Such snippets may be chained together into a desired execution sequence by pushing a series of pointer values into the process memory and then tricking the code into executing the first pointer value. This chained execution sequence does not follow the intended program execution order that the original program author intended, but may instead follow an alternative execution sequence. In this manner, an attacker may be able to execute arbitrary or unintended instructions.

BRIEF DESCRIPTION OF THE DRAWINGS

The figures are not to scale. In general, the same reference numbers will be used throughout the drawing(s) and accompanying written description to refer to the same or like parts.

Figure 1:
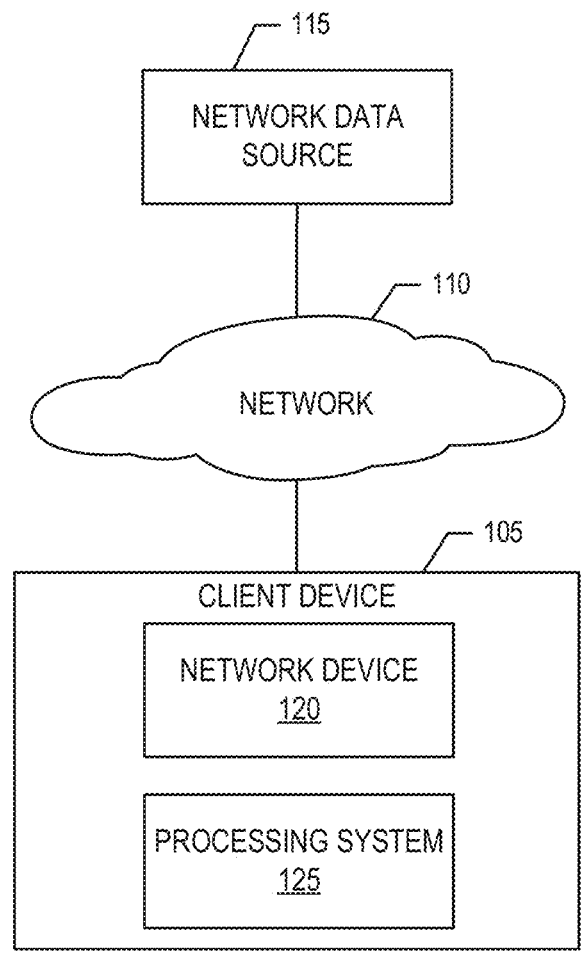
FIG. 1 illustrates a block diagram representative of an example client device receiving malicious data from an example network.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, file format exploits have become a ubiquitous problem for Internet users. Internet users having a computer or networked device, also referred to as a client device, typically run multiple software applications on their device. Such software applications operate by accepting files from external sources over a network and processing the files in order to display contents of the files to the user of the client device. The processing software in the software applications, such as file parsing software, may have vulnerabilities which can be exploited by the files. For example, files created by an attacker can exploit software application vulnerabilities and completely compromise the operating system of the client device.

In some examples, ROP chains inside malicious files are used to exploit the vulnerable processing software. Security software installed in client devices is used to protect the software applications from such file exploits. Conventional security software used to protect the operating system of the client device from ROP based exploits may be implemented at the processing system of the client device. For example, the security software is triggered when the exploit file reaches the processing core and/or processing memory (e.g., main memory, operating system, etc.). In some examples, the exploit file may be executed to enable the conventional security software to detect malicious exploit files. For example, the security software attempts to analyze the process memory when a certain operating system function is called. In other examples, the conventional security software checks if the return address is outside the allocated executable range of memory after a call is made to an application programming interface (API). In general, the conventional security software may encompass many methods to detect malicious files, however, the conventional security software is implemented at the processing system of the client device, thus warranting the target software application to process the malicious file and exploit its vulnerabilities.

Examples disclosed herein detect malicious files traversing over a network. For example, examples disclosed herein are implemented at a network device to scan incoming files for malicious content before the files reach the software application for which the malicious content is targeted. Examples disclosed herein include a screening controller to screen the incoming files for file types, such as an Office Open Extensible Markup Language (XML) (OOXML) file (e.g., files including the extensions '.docx,' '.xlsx,' '.pptx,' etc.), a Rich Text Format (RTF) file, etc. For example, such file types allow users to embed objects and controls into the files to give the users the ability to add extra functionality, thus enriching user experience of the software application. Attackers can utilize file types to embed malicious data into the files to be executed by the software applications.

Examples disclosed herein analyze embedded streams of binary data in the incoming files that were identified as an open file type (e.g., OOXML file type). For example, a stream analyzer, implemented by a network device, statically scans data in the files to identify a suspicious sequence of data (e.g., ROP based exploitation or any other malicious file exploitation). Examples disclosed herein describe methods to identify such suspicious sequences of data and flag the file as malicious.

FIG. 1 illustrates a block diagram representative of an example computing environment 100. The example computing environment 100 includes an example client device 105, an example network 110, and an example network data source 115. The example client device 105 includes an example network device 120 and an example processing system 125.

In the illustrated example of FIG. 1, the example client device 105 is a computing device that is communicatively coupled to a network (e.g., the network 110). The example client device 105 may include a plurality of software applications. For example, software applications such as word processing, video processing, image processing, video gaming, communication applications, etc. In some examples, the software applications operate by obtaining data over the network and processing such data to be viewed by the user of the client device 105. For example, the client device 105 may obtain a text file from the network 110 and the word processing application may process the text file to display data in the text file to the user. In some examples, such files require components of the client device 105 to read and write data. In some examples, if the files contain malicious content, the components of the client device 105 may be compromised, and thus controlled by the creator (e.g., attacker) of the malicious file. The example client device 105 may be any computing device, such as a cell phone, a laptop, a tablet, a desktop, a smart television, etc.

In the illustrated example of FIG. 1, the example network 110 is a wide area network (WAN) such as the Internet. However, in some examples, local networks may additionally or alternatively be used. For example, multiple networks (e.g., a cellular network, an Ethernet network, etc.) may be utilized to implement the example network 110 of FIG. 1. The example network 110 may provide various distribution channels to the client device 105 such as Internet channels (e.g., Chrome™ browser, Microsoft Edge, Internet Explorer®, Mozilla Firefox™, etc.) and Store Apps (e.g., Microsoft® Store, App Store®, etc.).

In the illustrated example of FIG. 1, the example network data source 115 provides data over the network 110 to the example client device 105. In some examples, the network data source 115 is a computing device, owned and/or utilized by a different user than the user of the client device 105. The example network data source 115 may be communicatively coupled to the network 110. In some examples, the network data source 115 is implemented by one or more servers providing Internet media (e.g., web pages, audio, video, images, etc.) to the client device 105.

In the illustrated example of FIG. 1, the example client device 105 includes the example network device 120 to enable the client device 105 to send, receive, and process data from the example network 110. For example, the network device 120 may be implemented by a Network Interface Card (NIC), a smart NIC, etc. The example network device 120 provides a hardware interface between the example client device 105 and the network 110. For example, the network device 120 obtains data from the network 110 or the processing system 125 (e.g., the CPU, FPGA, GPU, etc.) and translates, converts, compresses, decompresses, the data into a format that either the network 110 or the processing system 125 can interpret.

In some examples, the network device 120 includes additional functionality. For example, the network device 120 can implement security features to detect if data obtained from the network 110 is malicious. In some examples, the network device 120 can intercept the data before the data is converted and passed to the processing system 125. The example network device 120 is described in further detail below in connection with FIG. 3.

In the illustrated example of FIG. 1, the example processing system 125 processes data provided by the example network device 120. For example, the processing system 125 may include a processor and a memory to read, write, and execute the data. In some examples, the processing system 125 is susceptible to exploitation. In such examples, the network device 120 may identify and terminate data that would exploit and compromise the processing system 125.

Figure 2:
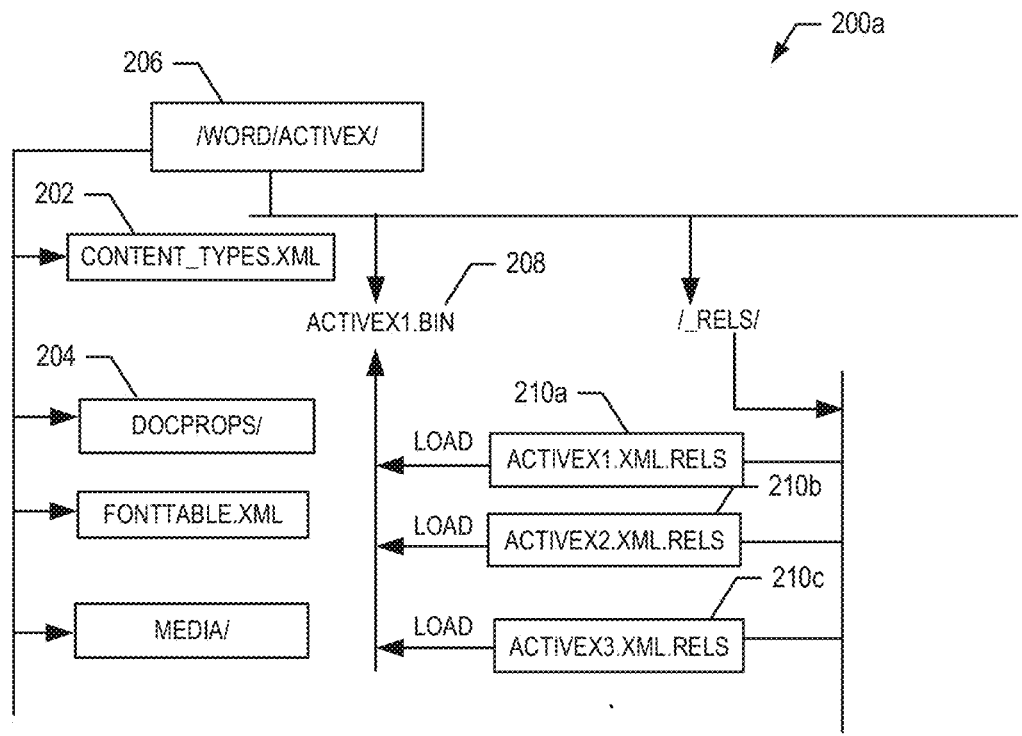
FIG. 2 illustrates an example first document file and an example second document file depicting two variations of malicious data loading.
Figure 2:
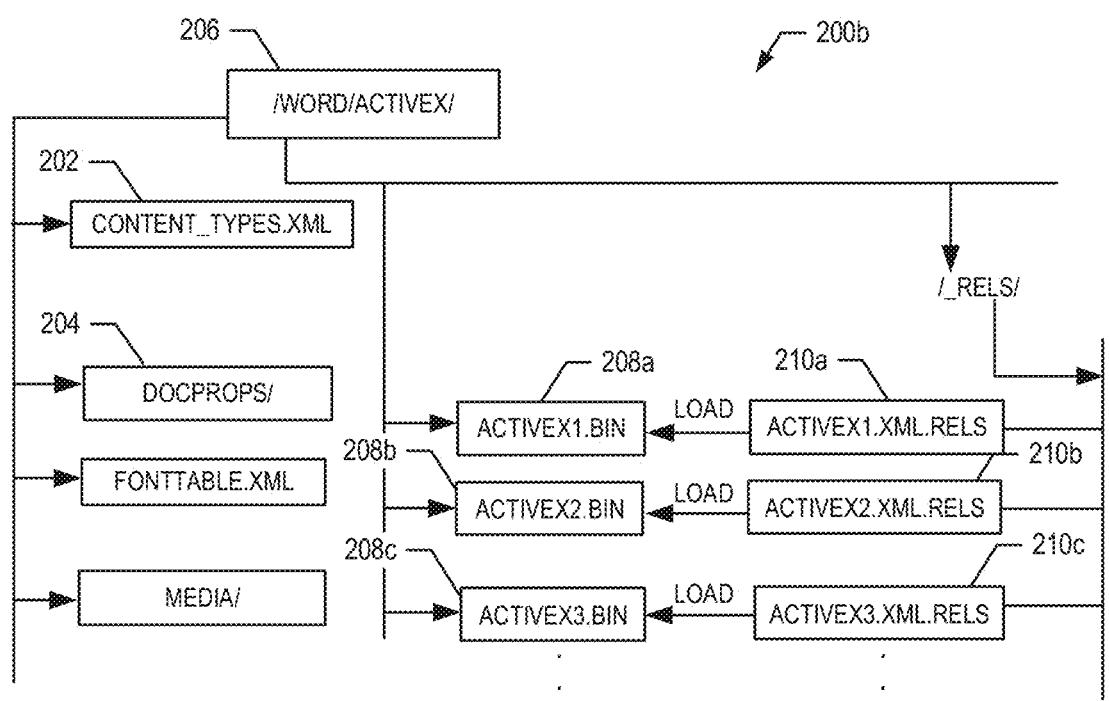

FIG. 2 illustrates an example first document file 200a and an example second document file 200b depicting two variations of malicious data loading. For example, ROP chains can be placed in the memory of the processing system 125 of FIG. 1 in more than one way. The example first document file 200a illustrates a first method and the example second document file 200b illustrates a second method.

The first and second document files 200a, 200b are a first type of document. For example, the first and second document files 200a, 200b are formatted in an open extensible mark-up language (OOXML). As used herein, an OOXML is an XML based format for office documents, including word processing documents, spreadsheets, presentations, charts, diagrams, shapes, and other graphical material. An XML based format is a markup language that defines a set of rules for encoding a document, including the office documents mentioned above, in a format that is both human-readable and machine-readable.

In the illustrated example, the first and second document files 200a, 200b include XML files. In the illustrated example of FIG. 2, "content_types.xml" 202 is indicative of the document body. For example, "content_types.xml" 202 includes document properties 204 (e.g., "docProps"), such as "app.xml" and "core.xml." Additionally in FIG. 2, other the first and second documents 200a, 200b include other XML parts, such as "styles.xml" which is indicative of style data of the document, "meta.xml" which indicative of the metadata of the document (e.g., author, title, etc.), "setting.xml" which is indicative of the settings for the document, and/or "manifest.xml" which is indicative of the files' descriptions.

In FIG. 2, the example first and second document files 200a, 200b include optional files. For example, optional files include embedded pictures, thumbnails, charts, documents, ActiveX objects, and/or Object Linking and Embedding (OLE) objects. An OLE object allows embedding and linking of the document file (e.g., 200a, 200b) to external documents and objects. An ActiveX object allows similar features and capabilities as an OLE object. In some examples, OLE objects and ActiveX objects are implemented on top of a Component Object Model (COM), which is a binary interface standard for software components. OLE and ActiveX expose an attack surface of documents that have been abused by attackers over past years to hide malicious resources. For example, OOXML files can be used to load OLE controls and/or ActiveX controls which can facilitate remote code execution. Thus, a document (e.g., document file 200) that supports COM (e.g., OOXML, RTF, etc.) can be abused by attackers.

For example, in FIG. 2, the first and second document files 200a, 200b include an embedded ActiveX "word" file 206. The example "word" file 206 may include an embedded COM object. For example, in the example first document file 200a, the "word" file 206 includes an embedded binary object 208 (e.g., "ActiveX1.bin"). In the example first document file 200a, the binary object 208 is loaded with a first data 210a, a second data 210b, and a third data 210c. The first, second, and third data 210a, 210b, 210c are XML based format. In some examples, the first, second, and third data 210a, 210b, 210c are created by an attacker and include malicious content. In such an example, the first document file 200a illustrates a first method by which an attacker may manipulate an open document type. For example, the attacker loads the same binary object 208 into the memory of the example processing system 125 of FIG. 1 with multiple data (e.g., "activeX1.xml.rels," "activeX2.xml.rels," and "activeX3.xml.rels"). For example, an XML file instructs the word processing application to load the object into the process memory (e.g., the memory of the example processing system 125). In such an example, the word processing application interprets the XML file (e.g., the first document file 200a) and subsequently loads the object(s) into the process memory.

In FIG. 2, the example second document file 200b illustrates an embedded first binary object 208a (e.g., "ActiveX1.bin"), second binary object 208b (e.g., "ActiveX2.bin"), and third binary object 208c (e.g., "ActiveX3.bin"). In the example second document file 200b, the first binary object is loaded with the first data 210a, the second binary object 208b is loaded with the second data 210b, and the third binary object 208c is loaded with the third data 210c. In some examples, the first, second, and third data 210a, 210b, 210c include malicious content. Thus, the example second document file 200b illustrates a second method by which an attacker may manipulate an open document type. For example, the attacker loads multiple binary objects (e.g., 208a, 208b, 208c) with similar data (e.g., 210a, 210b, 210c) into the memory of the example processing system 125.

The loading of binary objects, as illustrated in FIG. 2, is performed to manipulate the memory of the processing system 125 to eventually place data at an address controlled by the attacker. For example, the address controlled by the attacker is an address located in the process memory of the example processing system 125. Additionally and/or alternatively, a second type of document can be used as a container for malicious data files. For example, RTF documents can be manipulated to include (e.g., contain) malicious OOXML files. The function of security software is to block the first and second document types including malicious data from being executed and/or accessed by the processing system 125.

Figure 3:
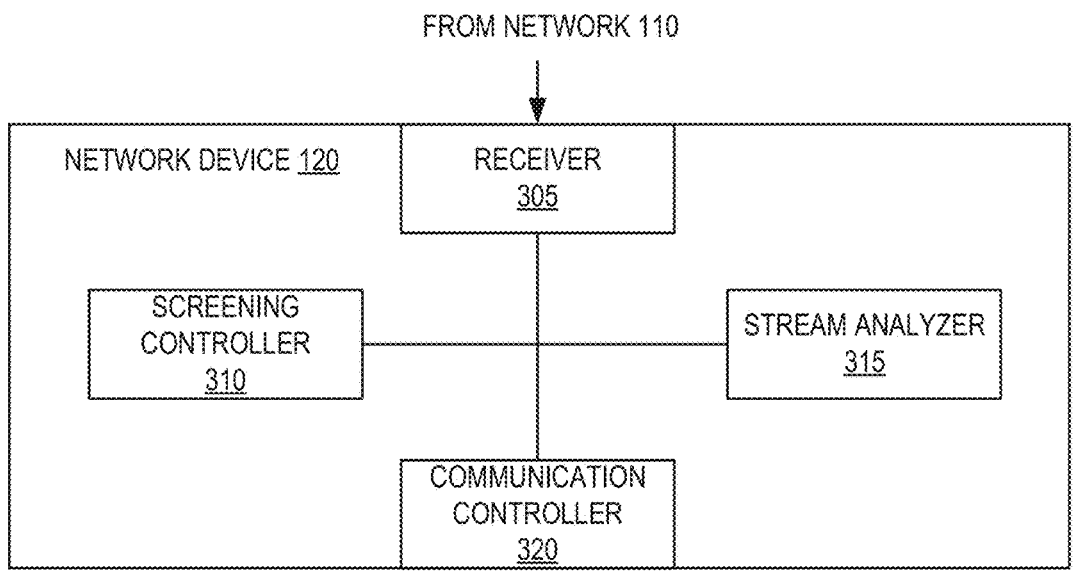
FIG. 3 illustrates a block diagram of an example network device of FIG. 1 to detect a malicious file received from the example network of FIG. 1.

Turning to FIG. 3, the example network device 120 is illustrated. The example network device 120 includes an example receiver 305, an example screening controller 310, an example stream analyzer 315, and an example communication controller 320.

In the illustrated example of FIG. 3, the example receiver 305 receives and/or obtains data from the network 110 of FIG. 1. For example, the receiver 305 may support Ethernet, Wi-Fi, Bluetooth, Zigbee, etc. In some examples, the receiver 305 obtains data from the network data source 115 via the network 110. In some examples, the data is zipped in a file. Such zipped files may include data corresponding to documents, such as the first document type and the second document type. However, the receiver 305 can obtain any other type of data. The example receiver 305 may provide any obtained data to the example screening controller 310. In some examples, the receiver 305 may provide the data to the communication controller 320.

In the illustrated example of FIG. 3, the example screening controller 310 obtains input data from the receiver 305 and identifies if the type of file is susceptible to manipulation. The example screening controller 310 identifies if the input file is a first type of document or a second type of document. For example, the screening controller 310 determines if the input file is a first open data file (e.g., an OOXML based data file). In other examples, the screening controller 310 determines if the input file is a second open data file (e.g., an RTF format file). In some examples, the screening controller 310 may analyze the metadata (e.g., the header, the extension, etc.) of the file to identify the type of file that was extracted from the network 110. For example, the screening controller 310 may search for metadata text that indicates the file is written in XML.

In some examples, if the screening controller 310 identifies the input file type as a first open data file (e.g., OOXML), then the screening controller 310 extracts data from the file. For example, the screening controller 310 may unzip the file. In some examples, if the screening controller 310 identifies the input file type as a second open data file (e.g., RTF), then the screening controller 310 parses the data structures of the input file. For example, the screening controller 310 separates the parts of the second open data file to identify if the second open data file includes the first open data file. For example, the screening controller 310 parses an RTF file and scans the parsed data to identify any XML files (e.g., OOXML files) that may be included in the RTF file.

If the example screening controller 310 does not identify the first open data file, then the input file is provided to the example communication controller 320. For example, input file types that are not open data files (e.g., OOXML files, RTF files, etc.) may not be infected with ROP chains. Thus, the input file can be provided to the processing system 125. If the example screening controller 310 does identify the first open data file in the input file, the example screening controller continues to scan the file for files, documents, data, that could be suspicious. For example, the screening controller 310 scans the first open data file for a COM directory. For example, the screening controller 310 attempts to identify embedded object files, such as ActiveX "word" file 206 of FIG. 2, in the open data file.

In some examples, if the screening controller 310 does not identify an COM directory within the first open data file, then the screening controller 310 provides the input file to the communication controller 320. For example, if COM directories are not present in the file, then an ROP attack technique is likely not used. In other examples, if the screening controller 310 identifies one or more COM directories within the open data file, the example screening controller 310 scans the directory for binary files. Typically, a COM directory includes at least one binary file even when the document is a safe document. Therefore, the example screening controller 310 counts a number of binary files in the COM directory.

For example, the screening controller 310 may include one or more internal counters. The internal counters may keep track of the number of times the example screening controller 310 identifies a binary file. For example, when the screening controller 310 identifies a binary file, an internal binary file counter may increment. In some examples, the screening controller 310 includes a preconfigured binary file threshold. For example, the developer of the client device 105 may define a binary file threshold indicative of a maximum number of binary files that can be loaded in the COM directory without being malicious. For example, it may be safe (e.g., normal) for a COM directory to have 10 binary files. However, if the number of binary files is above 10, this may indicate that the open document file is malicious. For example, the second document file 200b of FIG. 2 illustrates the loading of a plurality of binary files in the COM directory, which is suspicious.

In some examples, if the screening controller 310 identifies one binary file in the open data file, then the screening controller scans the metadata files in that binary file. For example, the screening controller 310 determines a number of metadata files included in the binary file. In such an example, the screening controller 310 includes an internal metadata file counter to track the number of metadata files identified. In some examples, the screening controller 310 includes a predefined metadata file threshold indicative of a maximum number of metadata files that can be included in the binary file before it is deemed suspicious. For example, it may be safe (e.g., normal) for a binary file to have 10 metadata files. However, if the number of metadata files exceeds 10, this may indicate that the open document file is malicious. For example, the first document file 200a of FIG. 2 illustrates the loading of a plurality of XML files in one binary file, which is suspicious.

If the example screening controller 310 determines the binary file threshold and/or the metadata file threshold is crossed, the example screening controller 310 triggers the example stream analyzer 315. For example, the screening controller 310 has identified that the input file is suspicious and triggers the stream analyzer 315 to detect the malicious data stream (e.g., the ROP chain) inside the input file. In some examples, if the screening controller 310 determines neither the binary file threshold nor the metadata file threshold is crossed, then the process ends, and the input file is provided to the communication controller 320.

In the illustrated example of FIG. 3, the example stream analyzer 315 statically analyzes a buffer of data provided by the example screening controller 310. For example, the screening controller 310 may read the data inside the binary files into a buffer and pass the buffer to the example stream analyzer 315. In some examples, the stream analyzer 315 preprocesses the data before performing a detection program on the data. In this manner, the example stream analyzer 315 reduces the amount of time it takes to detect the ROP chain. For example, preprocessing the data eliminates useless data that does not correspond to the ROP chain. In other examples, preprocessing the data enables an organization of data that assists the stream analyzer 315 in analyzing the data for an ROP chain. The example stream analyzer 315 is described in further detail below in connection with FIG. 4.

In the illustrated example of FIG. 3, the example communication controller 320 communicates data to the example processing system 125 (FIG. 1). For example, the communication controller 320 may convert and/or translate the input files, marked as safe, into a language that the processing system 125 can understand. In other examples, the communication controller 320 may send notifications to the processing system 125 indicative that the input file is malicious. In such an example, the processing system 125 can generate a message to the user of the client device 105 that the input file cannot be opened or accessed. In other examples, upon receiving a notification from the communication controller 320, the processing system 125 can generate a message to the user that malware was detected and terminated.

Figure 4:
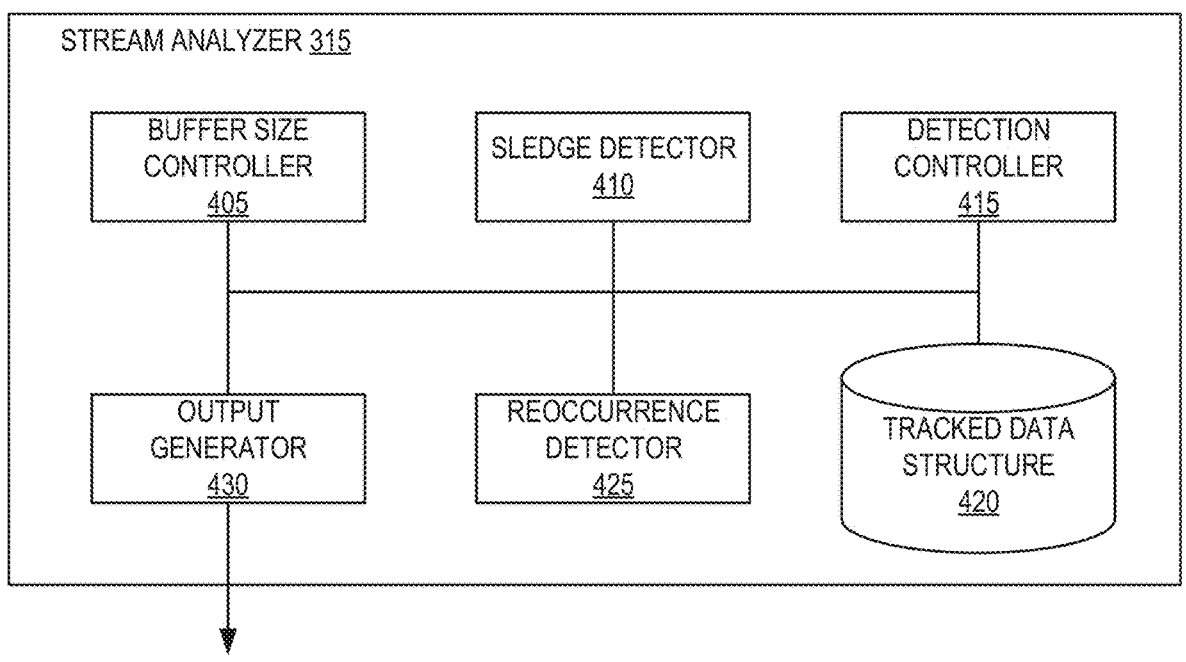
FIG. 4 illustrates a block diagram of an example stream analyzer of FIG. 3 to detect the malicious file received from the example network of FIG. 1.

FIG. 4 illustrates a block diagram of the example stream analyzer 315 of FIG. 3 to detect the malicious chained execution sequence. The example stream analyzer 315 includes an example buffer size controller 405, an example sledge detector 410, an example detection controller 415, an example tracked data structure 420, an example reoccurrence detector 425, and an example output generator 430.

In this illustrated example of FIG. 4, the example buffer size controller 405 preprocesses the buffer of data received from the example screening controller 310. For example, the buffer size controller 405 partitions and/or divides the data in the buffer into predetermined size sections. The size of the sections of data is configurable and can be changed based on the detection window that the user wishes to analyze. For example, the buffer size controller 405 may divide the buffer into predetermined sections of n bytes of data, where n can be equal to any value. For example, the buffer size controller 405 may group the data into 4 byte size sections (e.g., 32 bits). In such an example, if the data is in a hexadecimal format, the data may look as follows: {04 24 34 7C}, {04 24 34 7C}, {04 24 34 7C}, etc. Each section, identified by the braces, includes 4 bytes of data. Alternatively, the buffer size controller 405 can section the data into 2 bytes, 8 bytes, 16 bytes, or any size of bytes.

In the illustrated example of FIG. 4, the example sledge detector 410 determines if the buffer of data includes sledges. As used herein, a sledge is a repetitive sequence of similar n size sections of data, where a first or second byte of the section is indicative of a value within a configured range. In other words, a sledge is a repetitive sequence of the same 4 bytes of data, where the first or fourth byte is indicative of a value within the configured range. In some examples, the sledge detector 410 may define a sledge as a repetitive sequence of similar n size sections of data, where the first byte of the section is indicative of a value within the configured range. As used herein, the first byte of the section is indicative of a first byte of data in the section of bytes and the second byte of the section is indicative of a last byte of data in the section of bytes. The sledge detector 410 analyzes the first byte of the section of data or the last byte of the section of data depending on the processor architecture of the example processing system 125. For example, a processor formatted using little endian (e.g., increasing numeric significance with increasing memory addresses) stores the last byte first. For example, a sequence of ABCDEF is stored in memory as FEDCBA. Thus, the sledge detector 410 inspects the last byte (F) of the sequence because it corresponds to the first byte to be stored in memory.

However, a processor formatted using big endian (e.g., decreasing numeric significance with increasing memory addresses) stores the first byte first. Thus, the example sledge detector 410 inspects the first byte (A) of the sequence because it corresponds to the first byte to be stored in memory.

As mentioned above, the example sledge detector 410 and/or other words the example stream analyzer 315 includes a configurable range of values corresponding to possible memory addresses. As used herein, the configured memory address range corresponds to a range of potential hexadecimal and/or binary values that are indicative of memory addresses associated with the memory space of the example process (e.g., the memory space that stores the instructions of data during execution of the input file). For example, Dynamic Link Libraries (e.g., shared libraries) may occupy a range of 0x70000000 to 0x7FFFFFFF in the memory space of the processing system 125. Thus, the user can configure the range of the last or first byte to be from 0x70 to 0x7F. The range is a configurable parameter in order to enable the user to increase or decrease the sensitivity of the stream analyzer 315. For example, increasing the range increases sensitivity of detection if the code to which the embedded ROP address points to is mapped to lower address ranges.

The example sledge detector 410 begins operation by initializing an index to equal zero. The index is indicative of a location of the pointer in the buffer. The example sledge detector 410 begins by scanning the n size section of data that the index points to. If the example sledge detector 410 determines the n size section of data includes a first or last byte of data indicative of a value within the pre-configured range, then the sledge detector 410 generates a threshold number of instances of the n size section of data.

For example, the sledge detector 410 may be provided with a defined threshold number corresponding to a number of times the sledge detector 410 is to copy a section of data. The threshold number can be of any value, 10, 20, 100, 300, etc. For example, the index points to a 4 byte section of data {01 23 45 70}. Because the last byte falls within the pre-configured memory address range, the example sledge detector 410 copies the 4 bytes 100 times (e.g., 100×{01 23 45 70}). In this example, the threshold number is equal to 100.

In some examples, the sledge detector 410 concatenates the copies of the n size sections of data. For example, the sledge detector 410 creates a string of data utilizing the 100 copies of the 4 byte section. The example sledge detector 410 compares the string of data to the next n size sections of data in the buffer. For example, the index increments and the sledge detector 410 compares the next 100 n size sections of data with the string of data to identify a match. If the string matches the data in the buffer, the example sledge detector 410 removes the data that matched the string. For example, the sledge detector 410 removes the non-important and repetitive data to reduce the size of the buffer to increase the detection performance of the detection controller 415.

In some examples, if the sledge detector 410 determines n size section of data for which the index is pointing is not indicative of a value within the pre-configured memory address range, then the sledge detector 410 notifies the detection controller 415. No further preprocessing takes place. For example, the original data in the buffer is analyzed by the detection controller 415.

In the illustrated example of FIG. 4, the example detection controller 415 iterates through the n size sections of data to identify data that falls within the memory address range. In some examples, the detection controller 415 updates and/or builds the example tracked data structure 420. For example, the detection controller 415 adds suspicious n size sections of data to the tracked data structure 420. In some examples, the detection controller 415 defines and/or initializes lists for the tracked data structure 420 to store. For example, the detection controller 415 defines a suspicious list and a merged list, both of which are initialized to zero upon receiving a buffer of data.

In operation, the example detection controller 415 combines m sections of n size data into chunks. For example, a chunk represents a combination of m number of n size sections of data. In such an example, the detection controller 415 can define a chunk to be 4 sections of 4 bytes of data (e.g., 16 bytes of data). In other examples, a chunk may be 2 sections of 4 bytes of data, 4 sections of 2 bytes of data, etc.

The example detection controller 415 reinitializes the index to zero, wherein zero points to the first chunk of data in the remaining buffer data. The example detection controller 415 scans the first chunk of data corresponding to the index pointer. The example detection controller 415 scans the chunk of data to identify one or more sections of n bytes where the first or last byte is indicative of a value within the pre-configured memory address range. For example, the detection controller 415 is looking for values that may be possible embedded memory addresses. If the data is indicative of possible embedded memory addresses, then that data could be indicative of an ROP chain. Therefore, the example detection controller 415 identifies values that are potentially memory addresses, rather than data.

For example, the if the chunk of data is {EB 51 36 7C; EB 51 36 7C; 02 2B 37 7C; 01 02 00 00}, then the first and second sections (e.g., {EB 51 36 7C}) would be identified as having a last byte that falls within the memory address range of 0x70 to 0x7C, and thus is a memory address. Additionally, the third section (e.g., {02 2B 37 7C}) would also fall in that category. In some examples, if the detection controller 415 does not identify any sections of the chunk having a first or last byte indicative of a value within the memory address range, then the detection controller 415 increments the index and iterates through the next chunk of data in the buffer.

In some examples, if the detection controller 415 identifies a section of the chunk having a first or last byte indicative of a value within the memory address range, then the detection controller 415 updates the suspicious list with the particular section that included a first or last byte indicative of the value within the memory address range. For example, the suspicious list will store the 4 bytes of data. Additionally, the example detection controller 415 updates the merged list with the chunk of data. For example, the merged list stores the 16 bytes of data. In some examples, the detection controller 415 continues to scan sections of data in the chunk for values indicative of memory addresses.

When the example detection controller 415 completes scanning the chunk, the example detection controller 415 initiates the reoccurrence detector 425. For example, the detection controller 415 may notify the reoccurrence detector 425 that the tracked data structure 420 has been updated (e.g., the suspicious list and the merged list have been populated and/or updated).

In the illustrated example of FIG. 4, the example reoccurrence detector 425 detects an ROP chain by identifying a number of reoccurrences of a particular string of data. The example reoccurrence detector 425 includes a suspicious length threshold indicative of a maximum number of bytes that are not suspicious. The suspicious length threshold is compared to the suspicious list. For example, the suspicious list includes the section of n bytes of data, where the first or last byte are indicative of a value within the memory address range. If the length of the suspicious list exceeds the suspicious length threshold, then the detection process continues. If the length of the suspicious list does not meet or exceed the suspicious length threshold, then the example reoccurrence detector 425 notifies the example detection controller 415 to increment the index and scan new data. The length of the suspicious list corresponds to the number of sections (e.g., 4 bytes of data) in the suspicious list.

In some examples, the reoccurrence detector 425 concatenates the items in the merged list into a string. For example, the reoccurrence detector 425 appends the chunks of data in the merged list when the reoccurrence detector 425 determines the length of the suspicious list exceeds the suspicious length threshold. In some examples, the reoccurrence detector 425 compares the string of chunks to the remaining data in the buffer. For example, if the reoccurrence detector 425 concatenated 5 chunks of data into a string, then the reoccurrence detector 425 iterates through buffer data 5 chunks at a time.

In some examples, the reoccurrence detector 425 identifies one or more matches between the string and the buffer data. In such an example, an internal counter (e.g., a reoccurrence counter) may count the number of occurrences where the string matched the buffer data. For example, while the reoccurrence detector 425 iterates through the buffer data, the reoccurrence counter is incremented every time a match is identified.

In some examples, the reoccurrence detector 425 determines if the value of the reoccurrence counter exceeds a reoccurrence threshold. The reoccurrence threshold is indicative of a maximum number of times the string appears in the buffer data, thus indicating a malicious sequence. For example, if the string matches the buffer data a plurality of times in a row (e.g., the string appears as a sequence in the buffer data), then the matching buffer data can be indicative of an ROP chain. In this manner, the example reoccurrence detector 425 has identified the malicious data stream (e.g., the ROP chain) and notifies the output generator 430 to terminate the input file.

In the illustrated example of FIG. 4, the example output generator 430 generates notifications, messages, etc., for the example communication controller 320 (FIG. 3). For example, the output generator 430 notifies the communication controller 320 when an ROP attack has been detected. In some examples, the output generator 430 notifies the communication controller 320 that an ROP chain was not detected and that the input file can be processed. In some examples, the output generator 430 notifies the communication controller 320 that the input file is to be terminated. In other examples, the output generator 430 terminates the input file when marked as malicious.

While an example manner of implementing the network device 120 of FIG. 1 is illustrated in FIGS. 3 and 4, one or more of the elements, processes and/or devices illustrated in FIGS. 3 and 4 may be combined, divided, re-arranged, omitted, eliminated and/or implemented in any other way. Further, the example receiver 305, the example screening controller 310, the example stream analyzer 315, the example communication controller 320, the example buffer size controller 405, the example sledge detector 410, the example detection controller 415, the example reoccurrence detector 425, the example output generator 430, and/or, more generally, the example network device 120 of FIG. 1 may be implemented by hardware, software, firmware and/or any combination of hardware, software and/or firmware. Thus, for example, any of the example receiver 305, the example screening controller 310, the example stream analyzer 315, the example communication controller 320, the example buffer size controller 405, the example sledge detector 410, the example detection controller 415, the example reoccurrence detector 425, the example output generator 430, and/or, more generally, the example network device 120, could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example receiver 305, the example screening controller 310, the example stream analyzer 315, the example communication controller 320, the example buffer size controller 405, the example sledge detector 410, the example detection controller 415, the example reoccurrence detector 425, and/or the example output generator 430 is/are hereby expressly defined to include a non-transitory computer readable storage device or storage disk such as a memory, a digital versatile disk (DVD), a compact disk (CD), a Blu-ray disk, etc. including the software and/or firmware. Further still, the example network device 120 of FIG. 1 may include one or more elements, processes and/or devices in addition to, or instead of, those illustrated in FIGS. 3 and 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the network device 120 of FIG. 1 is shown in FIGS. 5, 6, 7A, and 7B. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the programs and/or parts thereof could alternatively be executed by a device other than the processor 812 and/or embodied in firmware or dedicated hardware. Further, although the example programs are described with reference to the flowcharts illustrated in FIGS. 5, 6, 7A, and 7B, many other methods of implementing the example network device 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5, 6, 7A, and 7B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 5:
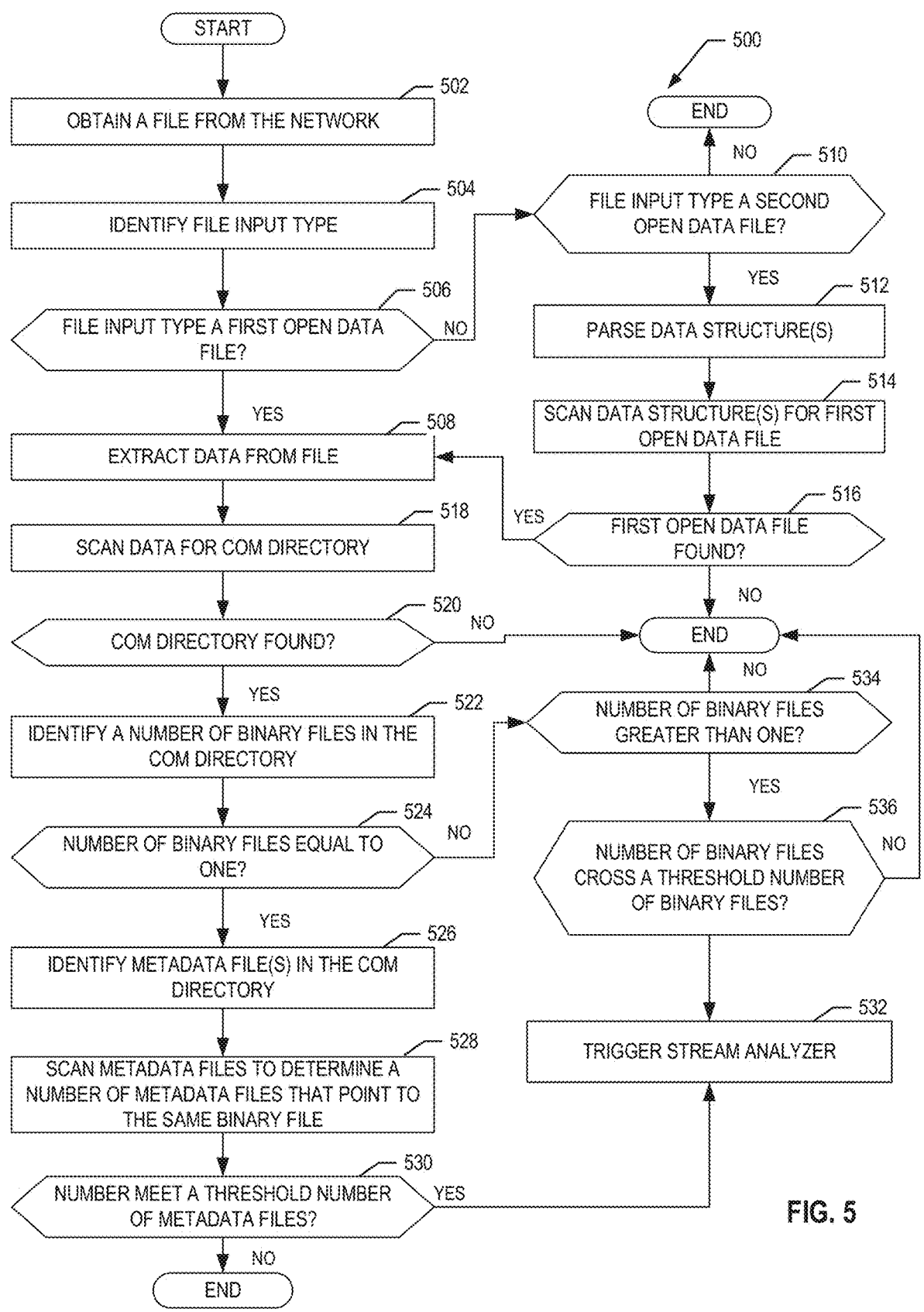
FIG. 5 illustrates a flowchart representative of machine readable instructions which may be executed to implement the example network platform of FIGS. 1 and 3 to identify a suspicious file obtained from the example network of FIG. 1.

FIG. 5 illustrates an example screening program 500 and is implemented by the example screening controller 310 (FIG. 3). The example screening program 500 begins when the example screening controller 310 obtains a file from the example receiver 305 (FIG. 3) (block 502). The example screening controller 310 identifies the file input type (block 504). For example, the screening controller 310 analyzes the file metadata to determine if the file is of a certain format that can be manipulated by an attacker.

The example screening controller 310 determines if the file input type is a first open data file (block 506). For example, the screening controller 310 determines if the file input type is an OOXML file. If the example screening controller 310 determines the file input type is a first open data file (e.g., block 506 returns a value YES), the example screening controller 310 extracts data from the file (block 508). For example, the screening controller 310 unzips the file to further analyze the contents of the file.

If the example screening controller 310 determines the file input type is not a first open data file (e.g., block 506 returns a value NO), the example screening controller 310 determines if the file input type is a second open data file (block 510). For example, the screening controller 310 determines if the file input type is an RTF file. If the example screening controller 310 determines the file input type is not a second open data file (e.g., block 510 returns a value NO), the process exits. For example, if the file input is not a type that would be manipulated by an attacker, then detection of malicious data does not occur. If the example screening controller 310 determines the file input type is a second open data file (e.g., block 510 returns a value YES), the example screening controller 310 parses the data structure(s) (block 512). For example, the screening controller 310 separates the parts of the second open data file.

The example screening controller 310 scans the data structure(s) for a first open data file (block 514). For example, the screening controller 310 determines if the first open data file is embedded within the second open data file. If the example screening controller 310 determines the first open data file is found (e.g., block 516 returns a value YES), then control turns to block 508, where the screening controller 310 extracts data from the first open data file. If the example screening controller 310 determines the first open data file is not found (e.g., block 516 returns a value NO), then the screening program 500 ends. For example, if the file does not include a first open data file, then the file is not analyzed for ROP attacks.

The example screening controller 310 scans the extracted data for a COM directory (block 518). For example, the screening controller 310 attempts to identify embedded object files, such as ActiveX "word" file 206 of FIG. 2, in the first open data file. In some examples, if the screening controller 310 does not identify an COM directory (e.g., block 520 returns a value NO), the screening program 500 ends. For example, the screening controller 310 provides the input file to the communication controller 320. For example, if COM directories are not present in the file, then ROP files are likely not present.

If the screening controller 310 identifies one or more COM directories within the file (e.g., block 520 returns a value YES), the example screening controller 310 identifies a number of binary files in the COM directory (block 522). For example, the screening controller 310 scans the directory for binary files. Typically, a COM directory includes at least one binary file even when the document is a safe document. Therefore, the example screening controller 310 counts the number of binary files in the COM directory.

The example screening controller 310 determines if the number of binary files are equal to one (block 524). For example, the screening controller 310 utilizes an internal binary file counter to determine the number of binary files that were identified. If the example screening controller 310 identifies one binary file in the open data file (e.g., block 524 returns a value YES), then the example screening controller 310 identifies metadata file(s) in the COM directory (block 526). For example, the screening controller 310 attempts to identify "rels" files. The example screening controller 310 scans the metadata files to determines a number of metadata files that point to the same binary file (block 528). For example, the screening controller 310 analyzes the value of the internal metadata file counter to determine the number of metadata files identified.

The screening controller 310 includes a predefined metadata file threshold indicative of a maximum number of metadata files that can be included in the binary file before it is deemed suspicious. The example screening controller 310 determines if the number of meets a threshold number of metadata files (block 530). For example, if the value of the metadata file counter crosses the threshold number of metadata files (e.g., block 530 returns a value YES), the screening controller 310 triggers the stream analyzer 315 (FIG. 3) (block 532). For example, if the number of metadata files exceeds the threshold, this may indicate that the file is malicious. If the number does not meet the threshold number of metadata files (e.g., block 530 returns a value NO), then the example screening program 500 ends. For example, the file may not malicious if there are a safe amount of metadata files pointing to the binary file.

In some examples, if the screening controller 310 determines the number of binary files is not equal to one (e.g., block 524 returns a value NO), the example screening controller 310 determines if the number of binary files is greater than one (block 534). For example, the COM directory includes at least one or more binary files or no binary files. Thus, if the example screening controller 310 determines there are no binary files (e.g., block 534 returns a value NO), the screening program 500 ends because there would be no files to scan for malicious data.

If the example screening controller 310 determines the number of binary files is greater than one (e.g., block 534 returns a value YES), the example screening controller 310 determines if the number of binary files cross a threshold number of binary files (block 536). For example, the screening controller 310 includes a pre-configured binary file threshold. The binary threshold defines a maximum number of binary files that can be loaded in the COM directory without being malicious. For example, it may be safe (e.g., normal) for a COM directory to have 10 or less binary files. Therefore, if the number of binary files cross a threshold number of binary files (e.g., block 536 returns a value YES), the example screening controller 310 triggers the example stream analyzer 315. If the number of binary files does not cross the threshold number of binary files (e.g., block 536 returns a value NO), the screening program 500 ends.

In some examples, the screening program 500 repeats when the network device 120 and/or the screening controller 310 receives a file from the network 110.

Figure 6:
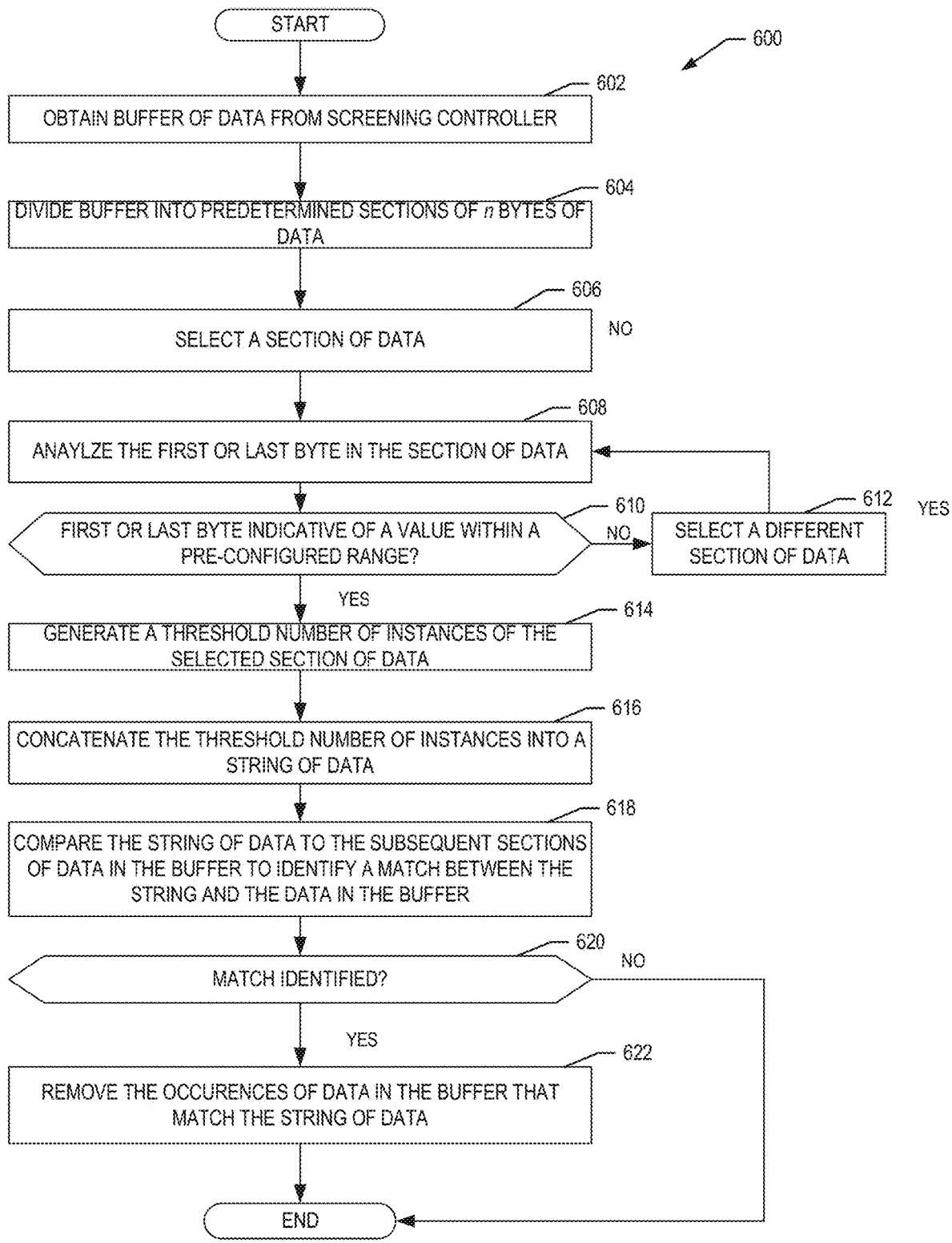
FIG. 6 illustrates a flowchart representative of machine readable instructions which may be executed to implement the example stream analyzer of FIGS. 3 and 4 to identify a sledge of data included in the file obtained from the example network of FIG. 1.

FIG. 6 illustrates an example sledge detection program 600 to detect a sledge of data when the screening controller 310 triggers the stream analyzer 315. The example sledge detection program 600 begins when the example stream analyzer 315 obtains a buffer of data from the screening controller 310 (block 602). For example, the buffer size controller 405 (FIG. 4) receives the buffer from the screening controller 310.

The example buffer size controller 405 divides the buffer into predetermined sections of n bytes of data (block 604). For example, the buffer size controller 405 groups, organizes, arranges, the data into manageable groups for quicker analysis. In 32 bit systems, the example buffer size controller 405 divides the data into sections of 4 bytes of data.

The example sledge detector 410 (FIG. 4) selects a section of data (block 606). For example, the sledge detector 410 may initialize an index to point to the first section of data in the buffer. The example sledge detector 410 analyzes the first or last byte in the section of data (block 608). For example, the sledge detector 410 analyzes the first or last byte in the section of data to check if the section looks like a memory address. The sledge detector 410 analyzes the first or last byte of data based on which byte is to be stored first in the main memory.

The example sledge detector 410 determines if the first or last byte is indicative of a value within a pre-configured memory range (block 610). For example, a pre-configured memory address range is defined and the example sledge detector 410 determines if the first or last byte of data is a hexadecimal value that falls within the memory address range. For example, if the pre-configured range is 0x70 to 0x7F, then a hexadecimal value of the first or last byte of the section of data having a value of 0x72 falls within the range. In some examples, if the sledge detector 410 determines the first or last byte is not indicative of a value within the pre-configured range (e.g., block 610 returns a value NO), the sledge detector 410 selects a different section of data (block 612). For example, the sledge detector increments the index and scans the next section of data that the index points to. In some examples, if the index is greater than the number of sections in the buffer, the sledge detection program 600 ends. For example, if the index exceeds the number of sections, then there are no sections to analyze.

If the example sledge detector 410 determines the first or last byte is indicative of a value within the pre-configured range (e.g., block 610 returns a value YES), the example sledge detector 410 generates a threshold number of instances of the selected section of data (block 614). For example, the sledge detector 410 is provided with a defined threshold number corresponding to a number of times the sledge detector 410 is to copy a section of data.

The example sledge detector 410 concatenates the threshold number of instances into a string of data (block 616). For example, the sledge detector 410 appends the copies of data to the original section of data. The example sledge detector 410 compares the string of data to the subsequent sections of data in the buffer to identify a match between the string and the data in the buffer (block 618). For example, the sledge detector 410 overlays the string onto the subsequent data in the buffer.

The example sledge detector 410 determines if a match was identified (block 620). For example, if the string and subsequent buffer data were equal and/or otherwise matched, the example sledge detector 410 determines a match was identified (e.g., block 620 returns a value YES). The example sledge detector 410 removes the occurrences of subsequent data in the buffer that match the string of data (block 622). For example, the sledge detector 410 eliminates the unnecessary sledge of data in the buffer. The sledge detection program 600 ends when the sledge is removed from the buffer.

If the example sledge detector 410 determines the string was not equal to the subsequent buffer data (e.g., block 620 returns a value NO), the example sledge detection program 600 ends and the original data in the buffer is maintained. The example sledge detection program 600 repeats when a new buffer of data is provided to the example sledge detector 410.

Figure 7A:
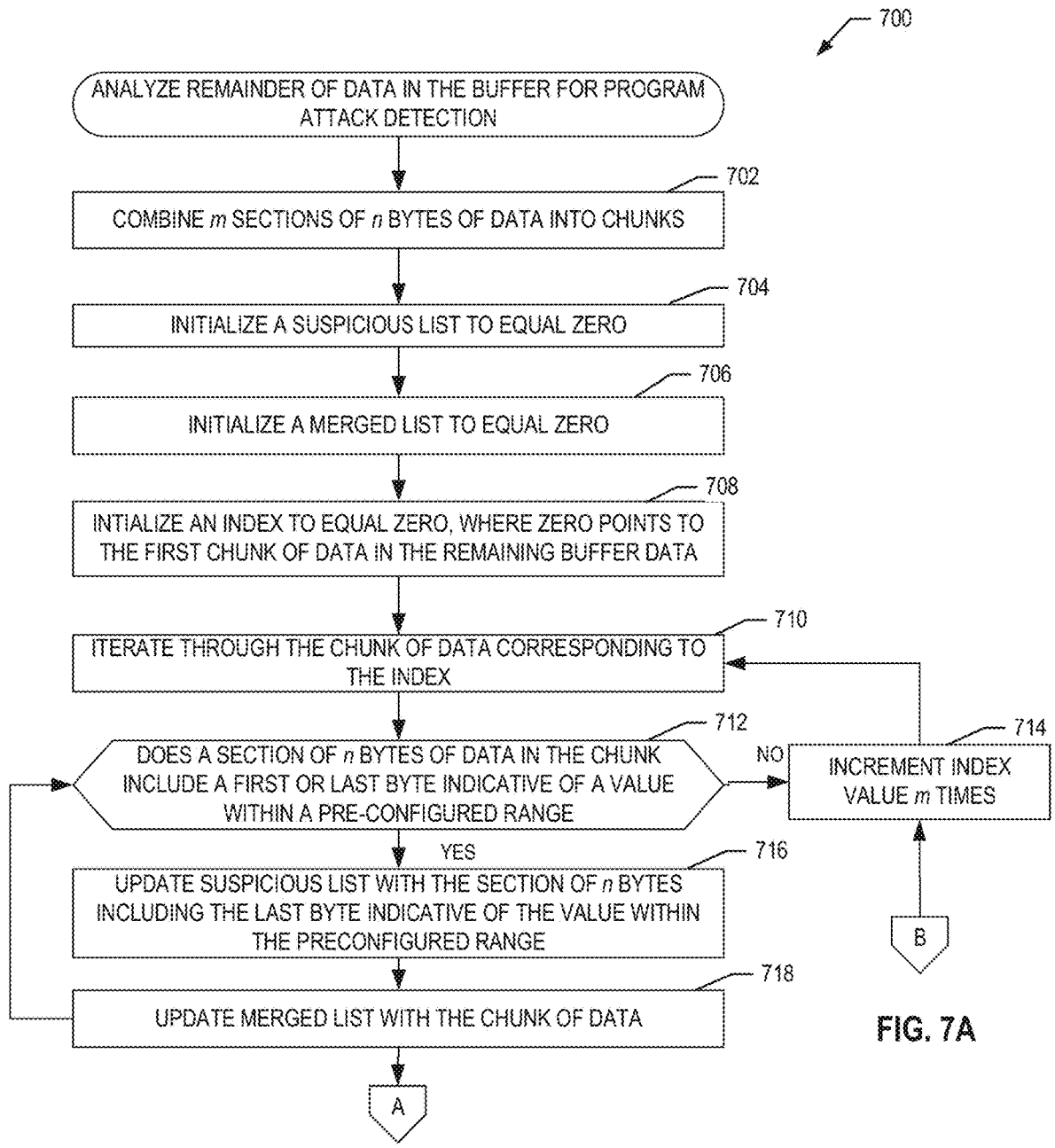
FIGS. 7A and 7B illustrate flowcharts representative of machine readable instructions which may be executed to implement the example stream analyzer of FIGS. 3 and 4 to detect a malicious sequence of data in the file obtained from the example network of FIG. 1.
Figure 7B:
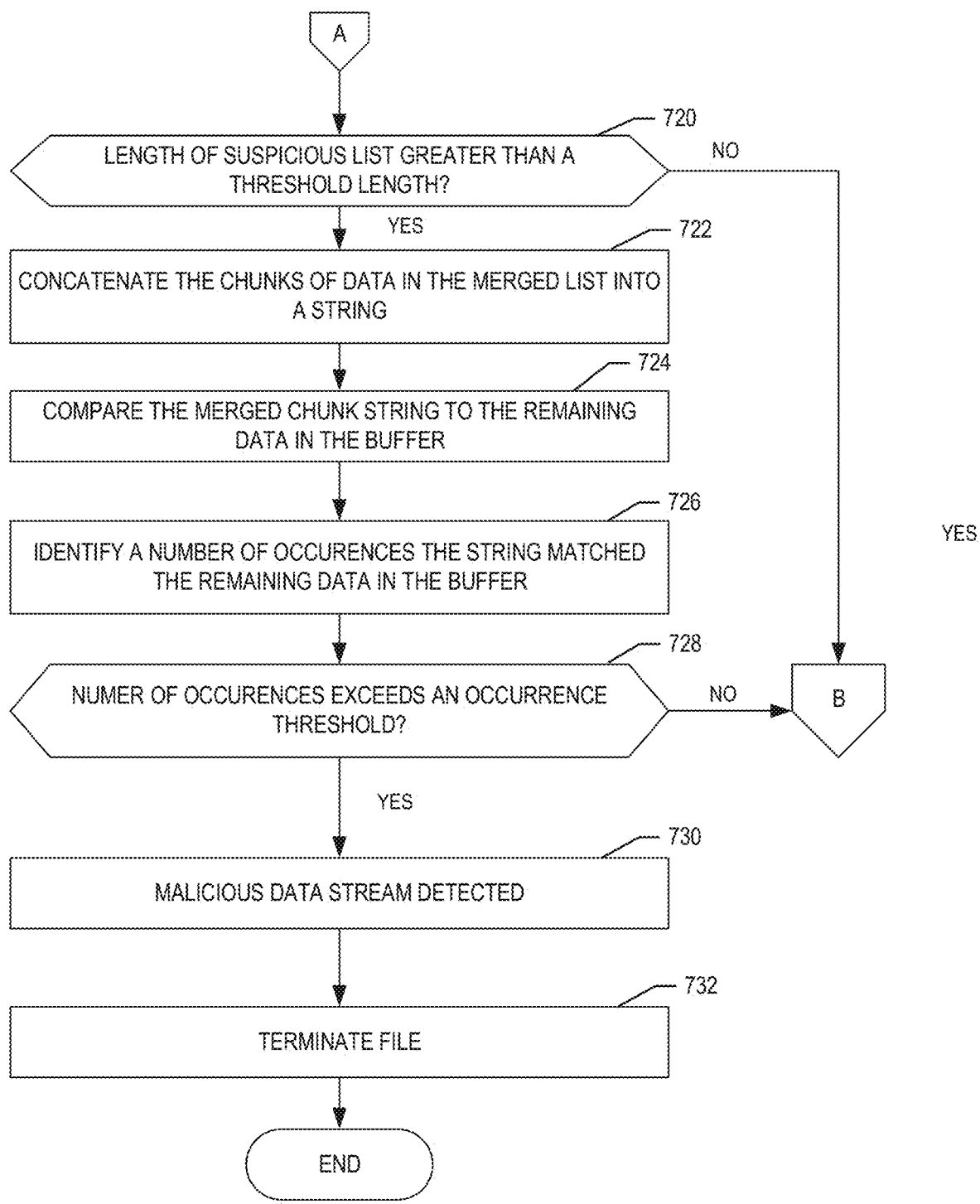

FIGS. 7A and 7B illustrate an example attack detection program 700 to detect an ROP chain in the remaining buffer data. FIG. 7A is implemented by the example detection controller 415 (FIG. 4) and the example tracked data structure 420 (FIG. 4). FIG. 7B is implemented by the example reoccurrence detector 425 (FIG. 4) and the example output generator 430 (FIG. 4). The example attack detection program 700 beings when the example detection controller 415 combines m sections of n bytes of data into chunks (block 702). For example, the detection controller 415 groups the sections of data, defined by the buffer size controller 405, into chunks. In some examples, the chunk is indicative of 4 sections of 4 bytes of data (e.g., 16 bytes of data).

The example detection controller 415 initializes a suspicious list to equal zero (block 704). For example, the detection controller 415 keeps a list of sections of data that are marked and/or flagged as suspicious. The example detection controller 415 initializes a merged list to equal zero (block 706). For example, the detection controller 415 keeps a list of chunks of data that include the sections flagged as suspicious. The example detection controller 415 initializes an index to equal zero, where zero points to the first chunk of data in the remaining buffer data (block 708).

The example detection controller 415 iterates through the chunk of data corresponding to the index (block 710). For example, the detection controller 415 scans and/or analyzes the first section of data in the chunk. The example detection controller 415 determines if a section of n bytes of data in the chunk include a first or last byte is indicative of a value within the pre-configured range (block 712). For example, the detection controller 415 determines if the first or last byte of data looks like a possible embedded memory address.

In some examples, if the detection controller 415 determines a byte is not including a value within the pre-configured range (e.g., block 712 returns a value NO), the example detection controller 415 increments the index value m times (block 714). For example, if the chunk is indicative of 4 sections of 4 bytes of data, the detection controller 415 increments the index value 5 times, in order to analyze the subsequent chunk of data without reanalyzing previous buffer data. The process repeats until the index value is greater than the number of chunks in the buffer of data.

In some examples, if the detection controller 415 determines a byte is indicative of a value within the pre-configured range (e.g., block 712 returns a value YES), the example detection controller 415 updates the suspicious list with the section of n bytes that includes the first or last byte indicative of the value within the pre-configured range (block 716). For example, the detection controller 415 populates the suspicious list with the bytes in the suspicious section.

The example detection controller 415 updates the merged list with the chunk of data (block 718). For example, the detection controller 415 populates the merged list with the bytes in the chunk including the suspicious section. In some examples, the tracked data structure 420 stores the suspicious and merged lists and therefore, the detection controller 415 populates the tracked data structure 420.

Turning to FIG. 7B, the example reoccurrence detector 425 determines if the length of the suspicious list is greater than a threshold length (block 720). For example, the reoccurrence detector 425 may periodically query the tracked data structure 420 to analyze the lists to determine if they are becoming too long (e.g., exceeding thresholds). For example, the reoccurrence detector 425 determines if there are suspicious amounts of data sections in the list. If the example reoccurrence detector 425 determines the length of the suspicious list is not greater than a threshold length (e.g., block 720 returns a value NO), control returns to block 714 of FIG. 7A.

If the example reoccurrence detector 425 determines the length of the suspicious list is greater than a threshold length (e.g., block 720 returns a value YES), the example reoccurrence detector 425 concatenates the chunks of data in the merged list into a string (block 722). For example, the reoccurrence detector 425 generates a string of the 4 sections of 4 bytes.

The example reoccurrence detector 425 compares the merged chunk string to the remaining data in the buffer (block 724). For example, the reoccurrence detector 425 iterates through the subsequent buffer data to identify a sequence of data matching the string. The example reoccurrence detector 425 identifies a number of occurrences that the string matched the remaining buffer data (block 726). For example, the reoccurrence detector 425 analyzes the value of the internal occurrence counter to determine the number of occurrences.

In some examples, the reoccurrence detector 425 determines if the number of occurrences exceeds an occurrence threshold (block 728). For example, the reoccurrence detector 425 determines if the number of times the string appeared in the remaining buffer data is a suspicious number. For example, the occurrence threshold indicates a malicious sequence. Therefore, if the reoccurrence detector 425 determines the number of occurrences exceeds the occurrence threshold (e.g., block 728 returns a value YES), the reoccurrence detector 425 detected the malicious data stream (block 730).

If the reoccurrence detector 425 determines the number of occurrences does not exceed the occurrence threshold (e.g., block 728 returns a value NO), control returns to block 714 of FIG. 7A.

When the malicious data stream is detected (block 730), the example output generator 430 terminates the file (block 732). For example, the reoccurrence detector 425 notifies the output generator 430 that an ROP chain was detected and that the file is to be terminated. Therefore, the file does not reach the processing system 125 and cannot manipulate the client device 105 (FIG. 1).

Figure 8:
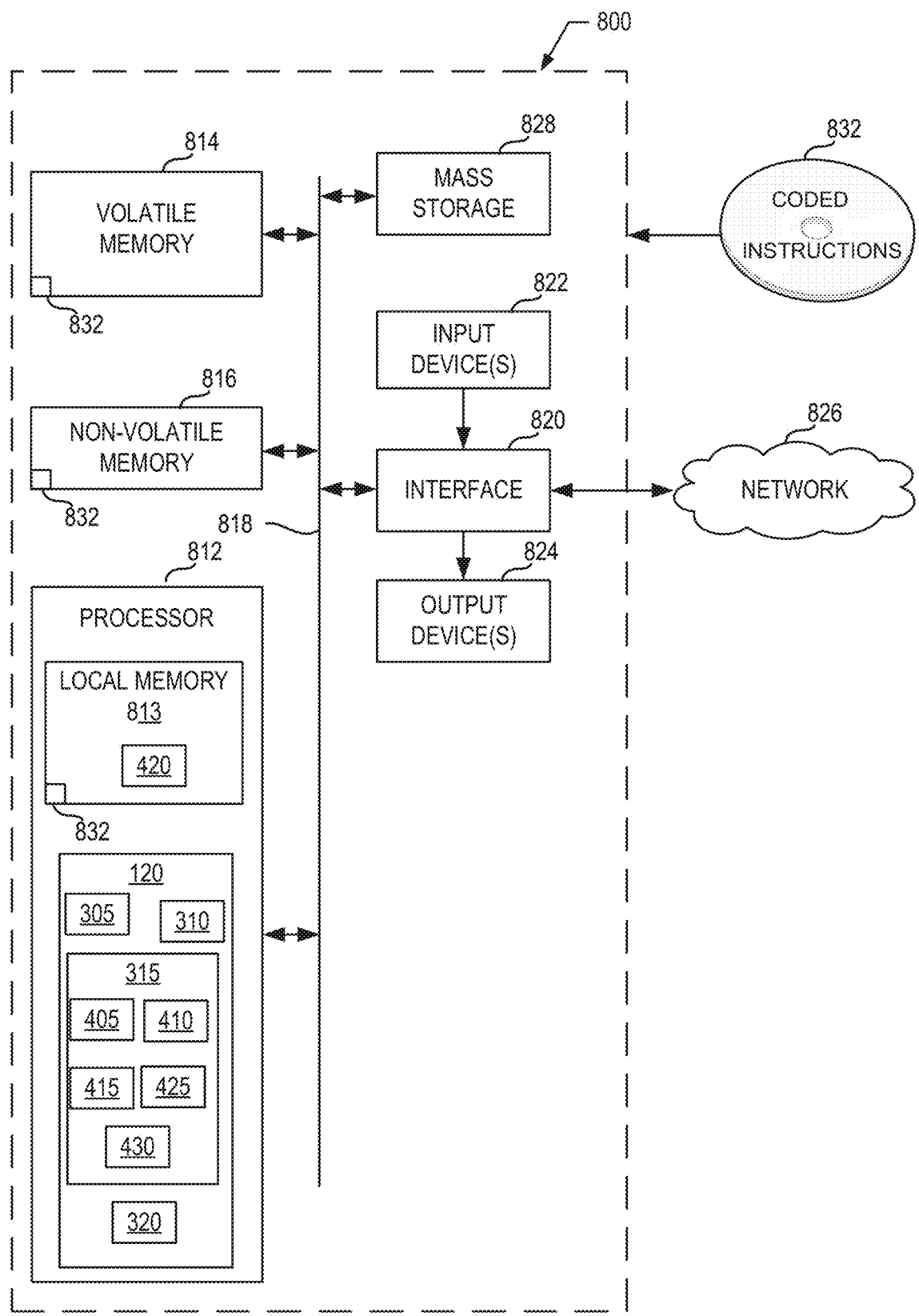
FIG. 8 is a block diagram of an example processing platform structured to execute the instructions of FIGS. 5, 6, 7A, and 7B to implement the example network platform of FIGS. 1 and 3.

FIG. 8 is a block diagram of an example processor platform 800 structured to execute the instructions of FIGS. 5, 6, 7A, and 7B to implement the network device 120 of FIGS. 1, 3, and 4. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a digital video recorder, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network device 120, the example receiver 305, the example screening controller 310, the example stream analyzer 315, the example communication controller 320, the example buffer size controller 405, the example sledge detector 410, the example detection controller 415, the example reoccurrence detector 425, and/or the example output generator 430.

The processor 812 of the illustrated example includes a local memory 813 (e.g., a cache). The local memory 813 implements the example tracked data structure 420. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), and/or a tactile output device. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 5, 6, 7A, and 7B may be stored in the mass storage device 828, in the volatile memory 814, in the non-volatile memory 816, and/or on a removable non-transitory computer readable storage medium such as a CD or DVD.

Figure 9:
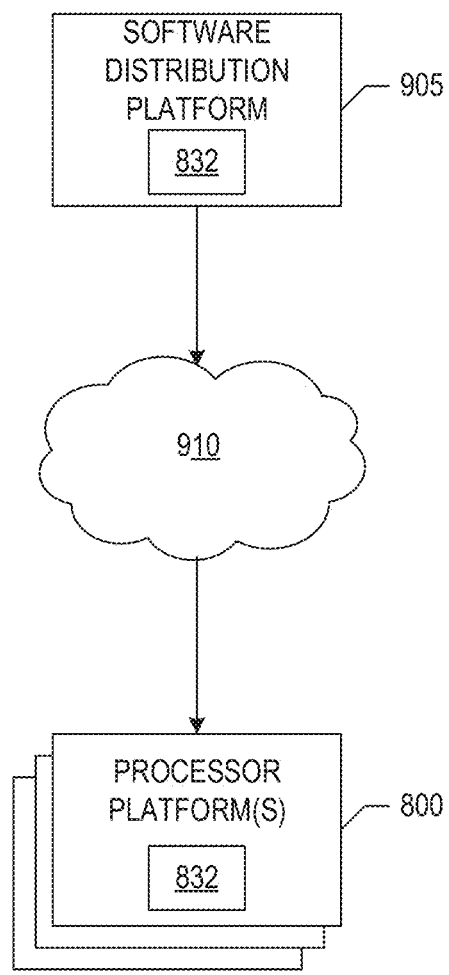
FIG. 9 is a block diagram of an example software distribution platform to distribute software (e.g., software corresponding to the example computer readable instructions of FIGS. 5, 6, 7A, and 7B) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 905 to distribute software such as the example computer readable instructions 832 of FIG. 8 to third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 832 of FIG. 8. The third parties may be consumers, users, retailers, OEMs, etc., who purchase and/ or license the software for use and/or re-sale and/or sublicensing. In the illustrated example, the software distribution platform 905 includes one or more servers and one or more storage devices. The storage devices store the computer readable instructions 832, which may correspond to the example computer readable instructions 500, 600, and 700 of FIGS. 5, 6, 7A, and 7B, as described above. The one or more servers of the example software distribution platform 905 are in communication with a network 910, which may correspond to any one or more of the Internet and/or any of the example networks 110 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 832 from the software distribution platform 905. For example, the software, which may correspond to the example computer readable instructions 500, 600, 700 of FIGS. 5, 6, 7A, and 7B, may be downloaded to the example processor platform 800, which is to execute the computer readable instructions 832 to implement the example network device 120. In some examples, one or more servers of the software distribution platform 905 periodically offer, transmit, and/or force updates to the software (e.g., the example computer readable instructions 832 of FIG. 8) to ensure improvements, patches, updates, etc. are distributed and applied to the software at the end user devices.

From the foregoing, it will be appreciated that example methods, apparatus and articles of manufacture have been disclosed that detect an ROP attack in incoming files from the network before the ROP attack reaches the processing system of the targeted device. The disclosed methods, apparatus and articles of manufacture improve the efficiency of using a computing device by reducing the amount of buffer data to increase the likelihood and efficiency of detecting the ROP attack. The disclosed methods, apparatus and articles of manufacture are accordingly directed to one or more improvement(s) in the functioning of a computer.

Example methods, apparatus, systems, and articles of manufacture to detect malicious data streams inside binary files are disclosed herein. Further examples and combinations thereof include the following:

Example 1 includes an apparatus comprising a detection controller to identify a section of a number of bytes of data in a buffer including a first or second byte of data indicative of a value within a preconfigured range, the preconfigured range corresponding to a range of values indicative of memory addresses, update a merged list with a chunk of data that includes the section having the first or second byte of data indicative of the value within the preconfigured range, and a reoccurrence detector to concatenate the chunk of data in the merged list into a string to identify a number of occurrences the string matches remaining data in the buffer, and in response to a detection of the number of occurrences exceeding an occurrence threshold, determine that the data includes a malicious data stream.

Example 2 includes the apparatus of example 1, wherein the detection controller is to iterate through the chunk of data in the buffer, the chunk of data corresponding to a number of sections of the number of bytes of data, the detection controller to analyze the number of sections in the chunk of data.

Example 3 includes the apparatus of example 1, wherein the detection controller is to update a suspicious list with the section including the first or second byte of data indicative of the value within the preconfigured range, compare a length of the suspicious list with a threshold length, and in response to the length of the suspicious list exceeding the threshold length concatenate the chunk of data in the merged list.

Example 4 includes the apparatus of example 1, further including an output generator to terminate an input file when the malicious data stream is detected, the input file including the data in the buffer.

Example 5 includes the apparatus of example 1, wherein the first byte is indicative of a first byte of data in the section of the number of bytes of data and the second byte is indicative of a last byte of data in the section of the number of bytes of data and further including a sledge detector to divide data in the buffer into sections of the number of bytes of data, analyze a first section of the number of bytes of data to determine if the first byte of data or the last byte of data in the first section is indicative of a memory address value, in response to the first section having the first byte of data or the last byte of data indicative of the memory address value generate a threshold number of instances of the first section, concatenate the threshold number of instances into a string of data, and compare the string of data to subsequent sections of data in the buffer to identify a match between the string and subsequent data.

Example 6 includes the apparatus of example 5, wherein the sledge detector is to remove the subsequent data in the buffer when the subsequent data matches the string of data.

Example 7 includes the apparatus of example 1, further including a screening controller to determine an input file as susceptible to manipulation, the input file including the number of bytes of data in the buffer.

Example 8 includes a non-transitory computer readable storage medium comprising instructions that, when executed, cause one or more processors to at least identify a section of a number of bytes of data in a buffer including a first or second byte of data indicative of a value within a preconfigured range, the preconfigured range corresponding to a range of values indicative of memory addresses, update a merged list with a chunk of data that includes the section having the first or second byte of data indicative of the value within the preconfigured range, concatenate the chunk of data in the merged list into a string to identify a number of occurrences the string matches remaining data in the buffer, and determine that the data includes a malicious data stream when the number of occurrences exceeds an occurrence threshold.

Example 9 includes the non-transitory computer readable storage medium of example 8, wherein the instructions, when executed, cause the one or more processors to iterate through the chunk of data in the buffer, the chunk of data corresponding to a number of sections of the number of bytes of data.

Example 10 includes the non-transitory computer readable storage medium of example 8, wherein the instructions, when executed, cause the one or more processors to update a suspicious list with the section including the first or second byte of data indicative of the value within the preconfigured range, compare a length of the suspicious list with a threshold length, and in response to the length of the suspicious list exceeding the threshold length concatenating the chunk of data in the merged list.

Example 11 includes the non-transitory computer readable storage medium of example 8, wherein the instructions, when executed, cause the one or more processors to terminate an input file when the malicious data stream is detected, the input file including the data in the buffer.

Example 12 includes the non-transitory computer readable storage medium of example 8, wherein the first byte is indicative of a first byte of data in the section of the number of bytes of data and the second byte is indicative of a last byte of data in the section of the number of bytes of data and wherein the instructions, when executed, cause the one or more processors to divide data in the buffer into sections of the number of bytes of data, analyze a first section of the number of bytes of data to determine if the first byte of data or the last byte of data in the first section is indicative of a memory address value, in response to the first section having the first byte of data or the last byte of data indicative of the memory address value generate a threshold number of instances of the first section, concatenate the threshold number of instances into a string of data, and compare the string of data to subsequent sections of data in the buffer to identify a match between the string and subsequent data.

Example 13 includes the non-transitory computer readable storage medium of example 12, wherein the instructions, when executed, cause the one or more processors to remove the subsequent data in the buffer when the subsequent data matches the string of data.

Example 14 includes the non-transitory computer readable storage medium of example 8, wherein the instructions, when executed, cause the one or more processors to determine an input file as susceptible to manipulation, the input file including the number of bytes of data in the buffer.

Example 15 includes a method comprising identifying a section of a number of bytes of data in a buffer including a first or second byte of data indicative of a value within a preconfigured range, the preconfigured range corresponding to a range of values indicative of memory addresses, updating a merged list with a chunk of data that includes the section having the first or second byte of data indicative of the value within the preconfigured range, concatenating the chunk of data in the merged list into a string to identify a number of occurrences the string matches remaining data in the buffer, and in response to a detection of the number of occurrences exceeding an occurrence threshold, determining that the data includes a malicious data stream.

Example 16 includes the method of example 15, further including iterating through the chunk of data in the buffer, the chunk of data corresponding to a number of sections of the number of bytes of data.

Example 17 includes the method of example 15, further including updating a suspicious list with the section including the first or second byte of data indicative of the value within the preconfigured range, comparing a length of the suspicious list with a threshold length, and in response to the length of the suspicious list exceeding the threshold length concatenating the chunk of data in the merged list.

Example 18 includes the method of example 15, further including terminating an input file when the malicious data stream is detected, the input file including the data in the buffer.

Example 19 includes the method of example 15, wherein the first byte is indicative of a first byte of data in the section of the number of bytes of data and the second byte is indicative of a last byte of data in the section of the number of bytes of data and further including dividing data in the buffer into sections of the number of bytes of data, analyzing a first section of the number of bytes of data to determine if the first byte of data or the last byte of data in the first section is indicative of a memory address value, in response to the first section having the first byte of data or the last byte of data indicative of the memory address value generating a threshold number of instances of the first section, concatenating the threshold number of instances into a string of data, and comparing the string of data to subsequent sections of data in the buffer to identify a match between the string and subsequent data.

Example 20 includes the method of example 19, further including removing the subsequent data in the buffer when the subsequent data matches the string of data.

Example 21 includes a server to distribute first software on a network, the server comprising at least one storage device including second instructions, and at least one processor to execute the second instructions to transmit first instructions over the network, the first instructions, when executed, to cause at least one device to identify an incoming file as a first open data file or a second open data file, the first or second open data file susceptible to manipulation, remove a sledge of data in the incoming file identified as the first or second open data file, the sledge of data corresponding to a sequence of repetitive data, analyze remaining data in the incoming file for one or more bytes of data indicative of a memory address value, and detect a sequence of the one or more bytes of data indicative of the memory address value as a malicious data stream. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   buffer size controller circuitry to divide data in a buffer into sections, the sections including a first section having a number of bytes of data;
   sledge detector circuitry to determine that a first byte of data of the first section or a last byte of data of the first section is indicative of a memory address value;
   a detection controller circuitry to:
      identify a second section of the number of bytes of data in the buffer including a second byte of data indicative of a value within a preconfigured range, the preconfigured range corresponding to a range of values indicative of memory addresses;
      update a merged list with a chunk of data that includes the second section having the second byte of data indicative of the value within the preconfigured range; and
   reoccurrence detector circuitry to:
      concatenate the chunk of data in the merged list into a string to identify a number of occurrences the string matches remaining data in the buffer; and
      in response to a detection of the number of occurrences exceeding an occurrence threshold, determine that the data includes a malicious data stream.

2. The apparatus of claim 1, wherein the detection controller circuitry is to iterate through the chunk of data in the buffer, the chunk of data corresponding to a number of sections of the number of bytes of data, the detection controller circuitry to analyze the number of sections in the chunk of data.

3. The apparatus of claim 1, wherein the detection controller circuitry is to:

update a suspicious list with the second section including the second byte of data indicative of the value within the preconfigured range;
compare a length of the suspicious list with a threshold length; and
in response to the length of the suspicious list exceeding the threshold length:
concatenate the chunk of data in the merged list.

4. The apparatus of claim 1, further including an output generator to terminate an input file when the malicious data stream is detected, the input file including the data in the buffer.

5. The apparatus of claim 1, wherein the sledge detector circuitry is to:
in response to the first section having the first byte of data or the last byte of data indicative of the memory address value:
generate a threshold number of instances of the first section;
concatenate the threshold number of instances into a string of data; and
compare the string of data to subsequent sections of data in the buffer to identify a match between the string and subsequent data.

6. The apparatus of claim 5, wherein the sledge detector circuitry is to remove the subsequent data in the buffer when the subsequent data matches the string of data.

7. The apparatus of claim 1, further including a screening controller to determine an input file as susceptible to manipulation, the input file including the number of bytes of data in the buffer.

8. A non-transitory computer readable storage medium comprising instructions that, when executed, cause one or more processors to at least:
divide data in a buffer into sections, the sections including a first section having a number of bytes of data;
determine that a first byte of data of the first section or a last byte of data of the first section is indicative of a memory address value;
identify a second section of the number of bytes of data in the buffer including a second byte of data indicative of a value within a preconfigured range, the preconfigured range corresponding to a range of values indicative of memory addresses;
update a merged list with a chunk of data that includes the second section having the second byte of data indicative of the value within the preconfigured range;
concatenate the chunk of data in the merged list into a string to identify a number of occurrences the string matches remaining data in the buffer; and
determine that the data includes a malicious data stream when the number of occurrences exceeds an occurrence threshold.

9. The non-transitory computer readable storage medium of claim 8, wherein the instructions, when executed, cause the one or more processors to iterate through the chunk of data in the buffer, the chunk of data corresponding to a number of sections of the number of bytes of data.

10. The non-transitory computer readable storage medium of claim 8, wherein the instructions, when executed, cause the one or more processors to:
update a suspicious list with the second section including the second byte of data indicative of the value within the preconfigured range;
compare a length of the suspicious list with a threshold length; and
in response to the length of the suspicious list exceeding the threshold length:
concatenating the chunk of data in the merged list.

11. The non-transitory computer readable storage medium of claim 8, wherein the instructions, when executed, cause the one or more processors to terminate an input file when the malicious data stream is detected, the input file including the data in the buffer.

12. The non-transitory computer readable storage medium of claim 8, wherein the instructions, when executed, cause the one or more processors to:
in response to the first section having the first byte of data or the last byte of data indicative of the memory address value:
generate a threshold number of instances of the first section;
concatenate the threshold number of instances into a string of data; and
compare the string of data to subsequent sections of data in the buffer to identify a match between the string and subsequent data.

13. The non-transitory computer readable storage medium of claim 12, wherein the instructions, when executed, cause the one or more processors to remove the subsequent data in the buffer when the subsequent data matches the string of data.

14. The non-transitory computer readable storage medium of claim 8, wherein the instructions, when executed, cause the one or more processors to determine an input file as susceptible to manipulation, the input file including the number of bytes of data in the buffer.

15. A method comprising:
dividing data in a buffer into sections, the sections including a first section having a number of bytes of data;
determining that a first byte of data of the first section or a last byte of data of the first section is indicative of a memory address value;
identifying a second section of the number of bytes of data in the buffer including a second byte of data indicative of a value within a preconfigured range, the preconfigured range corresponding to a range of values indicative of memory addresses;
updating a merged list with a chunk of data that includes the second section having the second byte of data indicative of the value within the preconfigured range;
concatenating the chunk of data in the merged list into a string to identify a number of occurrences the string matches remaining data in the buffer; and
in response to a detection of the number of occurrences exceeding an occurrence threshold, determining that the data includes a malicious data stream.

16. The method of claim 15, further including iterating through the chunk of data in the buffer, the chunk of data corresponding to a number of sections of the number of bytes of data.

17. The method of claim 15, further including:
updating a suspicious list with the second section including the second byte of data indicative of the value within the preconfigured range;
comparing a length of the suspicious list with a threshold length; and
in response to the length of the suspicious list exceeding the threshold length:
concatenating the chunk of data in the merged list.

18. The method of claim 15, further including terminating an input file when the malicious data stream is detected, the input file including the data in the buffer.

19. The method of claim 15, further including:
in response to the first section having the first byte of data or the last byte of data indicative of the memory address value:
- generating a threshold number of instances of the first section;
- concatenating the threshold number of instances into a string of data; and
- comparing the string of data to subsequent sections of data in the buffer to identify a match between the string and subsequent data.

20. The method of claim 19, further including removing the subsequent data in the buffer when the subsequent data matches the string of data.

21. A server to distribute first software on a network, the server comprising:
- at least one storage device including second instructions; and
- at least one microprocessor to execute the second instructions to transmit first instructions over the network, the first instructions, when executed, to cause at least one device to:
- identify an incoming file as a first open data file or a second open data file, the first or second open data file susceptible to manipulation;
- remove a sledge of data in the incoming file identified as the first or second open data file, the sledge of data corresponding to a sequence of repetitive data;
- analyze remaining data in the incoming file for one or more bytes of data indicative of a memory address value; and
- detect a sequence of the one or more bytes of data indicative of the memory address value as a malicious data stream.

* * * * *